United States Patent
Li et al.

(10) Patent No.: US 9,654,219 B2
(45) Date of Patent: May 16, 2017

(54) OPTICAL TRANSCEIVING USING SELF-HOMODYNE DETECTION (SHD) AND REMOTE MODULATION

(71) Applicant: Futurewei Technologies, Inc., Plano, TX (US)

(72) Inventors: Zhihong Li, San Jose, CA (US); Fei Zhu, Coral Gables, FL (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/093,564

(22) Filed: Apr. 7, 2016

(65) Prior Publication Data

US 2016/0301475 A1 Oct. 13, 2016

Related U.S. Application Data

(60) Provisional application No. 62/145,304, filed on Apr. 9, 2015.

(51) Int. Cl.
*H04B 10/00* (2013.01)
*H04B 10/40* (2013.01)
(Continued)

(52) U.S. Cl.
CPC ............ *H04B 10/40* (2013.01); *H04B 10/503* (2013.01); *H04B 10/54* (2013.01); *H04B 10/58* (2013.01); *H04B 10/616* (2013.01); *H04B 10/63* (2013.01)

(58) Field of Classification Search
USPC ................................................. 398/135–172
See application file for complete search history.

(56) References Cited

U.S. PATENT DOCUMENTS

| 5,367,397 A | * | 11/1994 | Tajima | ................. H01S 5/0687 398/137 |
|---|---|---|---|---|
| 7,068,411 B2 | * | 6/2006 | Dorrer | ..................... G01J 11/00 359/245 |

(Continued)

FOREIGN PATENT DOCUMENTS

| EP | 2693671 A1 | 2/2014 |
| WO | 9315566 A1 | 8/1993 |
| WO | 2014012256 A1 | 1/2014 |

OTHER PUBLICATIONS

Nakamura, et al., "30-Gbps (5-Gsymbol/s) 64-QAM Self-Homodyne Transmission over 60-km SSMF using Phase-Noise Cancelling Technique and ISI-Suppression Based on Electronic Digital Processing," Optical Society of America, Proceedings of the Optical Fiber Communication, OWG4.pdf, 2009, 3 pages.

(Continued)

*Primary Examiner* — Agustin Bello
(74) *Attorney, Agent, or Firm* — Conley Rose, P.C.

(57) ABSTRACT

A first optical transceiver node comprises: a laser configured to emit an input optical signal; a first splitter coupled to the laser and configured to split the input optical signal into a local oscillator (LO) optical signal and an unmodulated optical signal; and a receiver coupled to the first splitter and configured to: receive the LO optical signal from the first splitter; receive a modulated optical signal from a second optical transceiver node, wherein the modulated optical signal is a modulated version of the unmodulated optical signal; and perform phase noise cancellation of the modulated optical signal using the LO optical signal.

20 Claims, 8 Drawing Sheets

(51) Int. Cl.
*H04B 10/63* (2013.01)
*H04B 10/50* (2013.01)
*H04B 10/54* (2013.01)
*H04B 10/58* (2013.01)
*H04B 10/61* (2013.01)

(56) References Cited

U.S. PATENT DOCUMENTS

| | | | | |
|---|---|---|---|---|
| 7,209,664 | B1* | 4/2007 | McNicol | H04B 10/50 375/219 |
| 7,269,356 | B2* | 9/2007 | Winzer | H04B 10/60 398/135 |
| 7,526,211 | B2* | 4/2009 | Mcnicol | H04B 10/50 398/128 |
| 8,265,488 | B2* | 9/2012 | Davies | H04B 10/2575 398/128 |
| 8,705,970 | B2* | 4/2014 | Gottwald | H04J 14/0282 398/100 |
| 8,934,773 | B2* | 1/2015 | Gottwald | H04B 10/516 398/100 |
| 9,203,517 | B2* | 12/2015 | Zhou | H04B 10/614 |
| 2003/0058499 | A1 | 3/2003 | Reingand et al. | |
| 2007/0154221 | A1* | 7/2007 | McNicol | H04B 10/50 398/135 |
| 2008/0175593 | A1 | 7/2008 | Li | |
| 2008/0212974 | A1* | 9/2008 | Davies | H04B 10/2575 398/140 |
| 2010/0189445 | A1* | 7/2010 | Nakashima | H04B 10/60 398/152 |
| 2010/0329680 | A1* | 12/2010 | Presi | H04B 10/2587 398/79 |
| 2012/0294614 | A1* | 11/2012 | Cvijetic | H04J 14/0282 398/67 |
| 2014/0270769 | A1* | 9/2014 | Nazarathy | H04J 14/06 398/65 |
| 2015/0010307 | A1* | 1/2015 | Zhong | H04B 10/25754 398/68 |
| 2015/0030334 | A1* | 1/2015 | Eiselt | H04B 10/2575 398/79 |
| 2015/0155952 | A1* | 6/2015 | Lach | H04J 14/021 398/201 |
| 2016/0028480 | A1* | 1/2016 | Ito | H04B 10/2581 398/159 |
| 2016/0080032 | A1* | 3/2016 | Treyer | H04B 3/23 398/27 |
| 2016/0142132 | A1* | 5/2016 | Mizuguchi | H04B 10/6165 398/34 |
| 2016/0261346 | A1* | 9/2016 | Li | H04B 10/40 |
| 2016/0285657 | A1* | 9/2016 | Yu | H04B 10/0799 |
| 2016/0301475 | A1* | 10/2016 | Li | H04B 10/503 |

OTHER PUBLICATIONS

Man, et al., "A Low-Cost 4x25Gbps PAM4 Module for Short-Reach Optical Interconnection," IEEE Optical Interconnects Conference, 2014, pp. 127-128.

Gaudino, "Adavantages of Coherent Detection in Reflective PONs," Proceedings of the Optical Fiber Communication, OFC/NFOEC Technical Digest, OM2A.1.pdf, 2013, 3 pages.

Li, et al., "Bidirectional Self-Homodyne Detection (SHD) Optical Transceiver," U.S. Appl. No. 62/127,118, filed Mar. 2, 2015; 20 pages.

Dany-Sebastien, et al., "Coherent Detection of Optical Quadrature Phase-Shift Keying Signals with Carrier Phase Estimation," Journal of Lightwave Technology, vol. 24, No. 1, Jan. 2006, pp. 12-21.

Liu, et al., "Homodyne OFDM with Optical Injection Locking for Carrier Recovery," Journal of Lightwave Technology, vol. 33, No. 1, Jan. 1, 2015, pp. 34-41.

Li, et al., "Optical Transceiver Using Duplex Media, Self-Homodyne Detection (SHD), coherent Detection, and Uncooled Laser," U.S. Appl. No. 15/055,204, filed Feb. 26, 2016; 29 pages.

Nakamura, et al., "QPSK-Homodyne Transmission using a Multi-Wavelength Fabry-Perot Laser Diode," Proceedings of the Laser and Electro-Optics Conference, Baltimore, 2007, 2 pages.

Puttnam, et al., "Self-Homodyne Detection in Optical Communication Systems," Photonics, vol. 1, 2014, pp. 110-130.

Foreign Communication From a Counterpart Application, PCT Application No. PCT/US2016/026516, International Search Report dated Jul. 6, 2016, 6 pages.

Foreign Communication From a Counterpart Application, PCT Application No. PCT/US2016/026516, Written Opinion dated Jul. 6, 2016, 7 pages.

* cited by examiner

OPTICAL TRANSCEIVING USING SELF-HOMODYNE DETECTION (SHD) AND REMOTE MODULATION

CROSS-REFERENCE TO RELATED APPLICATIONS

This application claims priority to U.S. provisional application No. 62/145,304 filed Apr. 9, 2015 by Zhihong Li, et al., and titled "Coherent Self-Homodyne Detection (SHD) Optical Transceiver," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The use of optical fibers as media for transmission of digital data is becoming more popular due to the high reliability and the large available bandwidth. Traffic in short-reach networks such as metro, access, and data center networks is growing significantly and will likely dominate traffic in long-haul networks. As a result, there is a need for high-capacity optical transceivers designed for short-reach networks. Short-reach networks may refer to networks with relatively short transmission distances and may have no repeaters. Long-haul networks may refer to networks with transmission distances of hundreds or thousands of kilometers (km) and may require repeaters. Metro networks may refer to networks with transmission distances in between short-reach networks and long-haul network and may or may not have repeaters.

The Institute of Electrical and Electronics Engineers (IEEE) is developing a 400 gigabit per second (Gb/s) Ethernet standard that implements intensity modulation and direct detection (IM-DD) using 8 or 16 channels. However, the need for data rates reaching 1 terabit per second (Tb/s) and higher, IM-DD will require an impractical number of channels.

SUMMARY

In one embodiment, the disclosure includes a first optical transceiver node comprising: a laser configured to emit an input optical signal; a first splitter coupled to the laser and configured to split the input optical signal into a local oscillator (LO) optical signal and an unmodulated optical signal; and a receiver coupled to the first splitter and configured to: receive the LO optical signal from the first splitter; receive a modulated optical signal from a second optical transceiver node, wherein the modulated optical signal is a modulated version of the unmodulated optical signal; and perform phase noise cancellation of the modulated optical signal using the LO optical signal. In some embodiments, the first optical transceiver further comprises a first port coupled to the first splitter and configured to: receive the unmodulated optical signal from the first splitter; and transmit the unmodulated optical signal to the second optical transceiver node; the first optical transceiver node further comprises a second port coupled to the receiver and configured to: receive the modulated optical signal from the second optical transceiver node; and pass the modulated optical signal to the receiver; the first optical transceiver node further comprises: a second splitter coupled to the first splitter; and a port coupled to the second splitter; the second splitter is configured to: receive the unmodulated optical signal from the first splitter; pass the unmodulated optical signal to the port; receive the modulated optical signal from the port; and pass the modulated optical signal to the receiver; the port is configured to: receive the unmodulated optical signal from the second splitter; transmit the unmodulated optical signal to the second optical transceiver node; receive the modulated optical signal from the second optical transceiver node; and pass the modulated optical signal to the second splitter; the laser and the receiver are together configured to implement self-homodyne detection (SHD) using remote modulation; the laser is an uncooled distributed feedback (DFB) laser with a linewidth greater than 100 kilohertz (kHz).

In another embodiment, the disclosure includes a first optical transceiver node comprising: a first port configured to: transmit a first unmodulated optical signal to a second optical transceiver node, wherein the first unmodulated optical signal is at a first wavelength; and receive a first modulated optical signal from the second optical transceiver node, wherein the first modulated optical signal is at the first wavelength and is a modulated version of the first unmodulated optical signal; and a second port configured to: receive a second unmodulated optical signal from the second optical transceiver node, wherein the second unmodulated optical signal is at a second wavelength; and transmit a second modulated optical signal from the second optical transceiver node, wherein the second modulated optical signal is at the second wavelength and is a modulated version of the second unmodulated optical signal. In some embodiments, the first optical transceiver node further comprises: a laser configured to emit an input optical signal, wherein the input optical signal is at the first wavelength; and a first splitter coupled to the laser and configured to split the input optical signal into a first local oscillator (LO) optical signal and the first unmodulated optical signal, wherein the first LO optical signal and the first unmodulated optical signal are at the first wavelength; the first optical transceiver node further comprises a second splitter coupled to the first splitter and the first port and configured to pass the first unmodulated optical signal to the first port; the first optical transceiver node further comprises a receiver configured to: receive the first LO optical signal from the first splitter; receiver the first modulated optical signal from the second splitter; and perform phase noise cancellation of the first modulated optical signal using the first LO optical signal; the first optical transceiver node further comprises a splitter coupled to the second port and configured to: receive the second unmodulated optical signal from the second port; receive the second modulated optical signal; and pass the second modulated optical signal to the second port; the first optical transceiver node further comprises a modulator configured to: receive the second unmodulated optical signal from the splitter; receive an electrical data signal; modulate the second unmodulated optical signal using both amplitude information and phase information based on the electrical data signal to produce the second modulated optical signal; and pass the second modulated optical signal to the splitter; the first optical transceiver node is configured to reduce a broadband back reflection interference noise between the first modulated optical signal and the second modulated optical signal by receiving the first modulated optical signal via the first port and receiving the second modulated optical signal via the second port.

In yet another embodiment, the disclosure includes a method implemented in a first optical transceiver node, the method comprising: emitting a first input light at a wavelength; splitting the first input light into a first unmodulated optical signal and a first local oscillator (LO) optical signal, wherein the first unmodulated optical signal and the first LO optical signal are at the wavelength; modulating the first unmodulated optical signal to produce a first modulated optical signal at the wavelength; and transmitting the first LO optical signal and the first modulated optical signal to a second optical transceiver node for self-homodyne detection (SHD) at the second optical transceiver node. In some embodiments, the method further comprises: emitting a second input light at the wavelength; splitting the second input light into a second LO optical signal and a second unmodulated optical signal, wherein the second LO optical signal and the second unmodulated optical signal are at the wavelength; transmitting the second unmodulated optical signal to a second optical transceiver node; receiving a second modulated optical signal from the second optical transceiver node, wherein the second modulated optical signal is a modulated version of the second unmodulated optical signal at the wavelength; and performing SHD using the second LO optical signal and the second modulated optical signal; the method further comprises: performing coherent detection of the second modulated optical signal using the second LO optical signal to determine amplitude information of an analog detected signal; processing the analog detected signal; and converting the analog detected signal to a digital detected signal; the transmitting the first modulated optical signal comprises transmitting the first modulated optical signal using a first medium, and wherein the receiving the second modulated optical signal comprises receiving the second modulated optical signal using a second medium; the method further comprises providing a centralized light source for both the first optical transceiver node and the second optical transceiver node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for improved optical transceivers. The transceivers implement SHD and remote modulation. SHD means that a transmitter transmits both a local oscillator (LO) optical signal and a modulated signal from the same laser and that a receiver then uses the LO optical signal to perform phase noise cancellation of the modulated optical signal when a light path difference between the LO optical signal and the modulated optical signal is small enough. SHD obviates the need for more expensive narrow linewidth lasers, particularly when using higher-order modulation formats that are sensitive to phase noise and spectrally efficient. SHD also obviates the need for frequency offset tracking, thus simplifying digital signal processing (DSP) and reducing power consumption. Remote modulation means that a first node with a receiver receives a modulated optical signal from a second node with a modulator. In other words, the modulation occurs remote from the first node. Remote modulation simplifies the design of transceiver nodes. Finally, the disclosed embodiments realize single-wavelength, bidirectional operation by eliminating or significantly reducing broadband back reflection interference noise; increase design flexibility, simplify network management, and reduce inventory cost; and eliminate narrowband back reflection interference noise.

Figure 1:
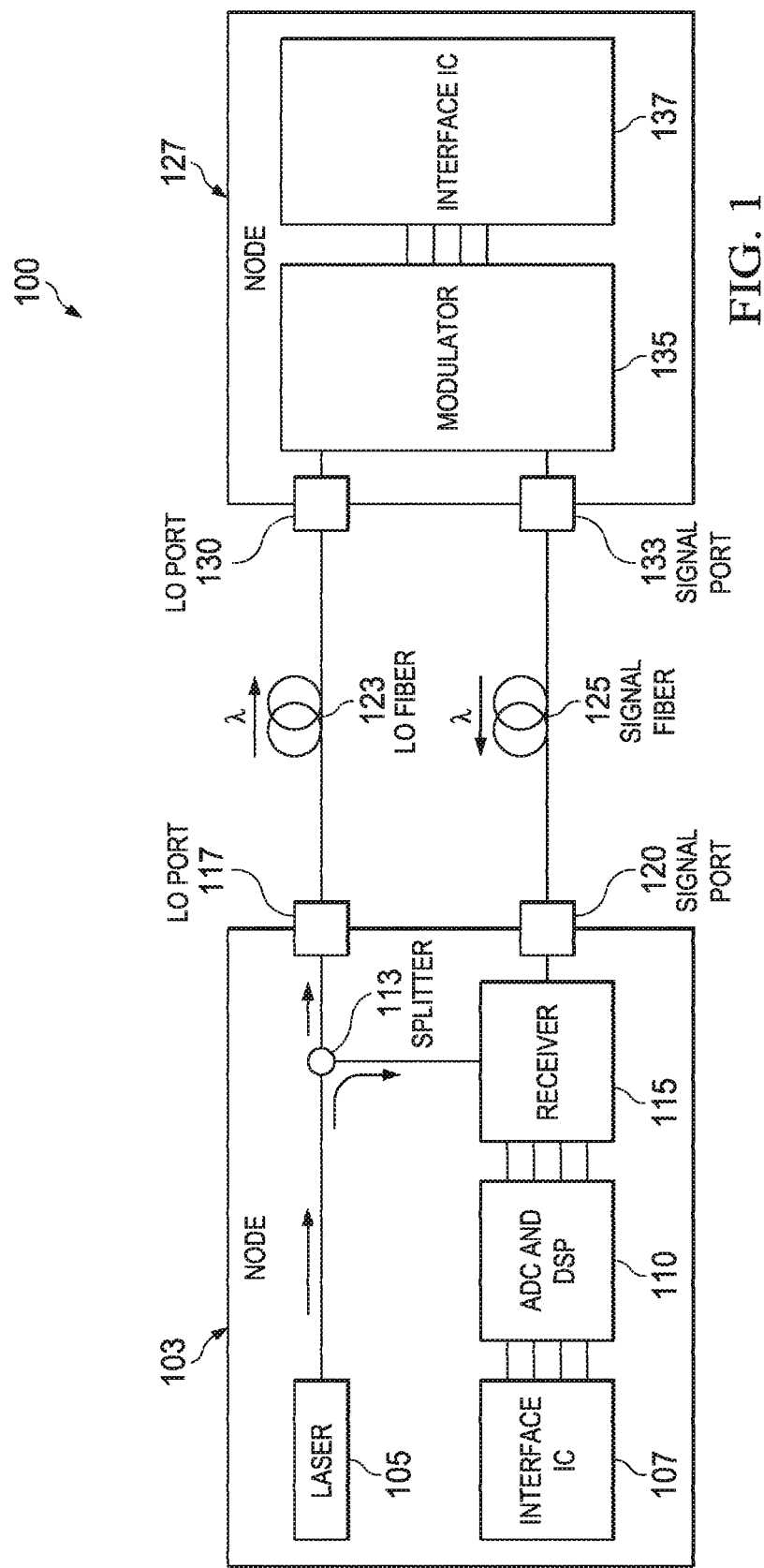
FIG. 1 is a schematic diagram of an optical communications system according to an embodiment of the disclosure.

FIG. 1 is a schematic diagram of an optical communications system 100 according to an embodiment of the disclosure. The system 100 generally comprises a node 103 and a node 127 coupled to each other via an LO fiber 123 and a signal fiber 125. A first direction from the node 103 to the node 127 is referred to as a downstream direction or downlink direction, and a second direction from the node 127 to the node 103 is referred to as an upstream direction or uplink direction. The nodes 103, 127 may make up a short-reach optical network in some examples.

The node 103 comprises a laser 105, an interface integrated circuit (IC) 107, an analog-to-digital converter (ADC) and DSP 110, a splitter 113, a receiver 115, a LO port 117, and a signal port 120. The laser 105 is any laser that provides continuous wave (CW) light at a wavelength $\lambda$. The wavelength $\lambda$ may be in the O band, which is from about 1,260 nanometers (nm) to about 1,360 nm, or the C/L band, which is from about 1,530 nm to about 1,625 nm. The laser 105 is a distributed feedback (DFB) laser without temperature control or other wavelength control. In that case, the laser 105 may be referred to as an uncooled laser and may have a linewidth greater than 100 kilohertz (kHz) and even as great as 1 megahertz (MHz) or higher. Alternatively, the laser 105 is a narrow linewidth external cavity laser (ECL). The node 103 need not comprise additional lasers.

The interface IC 107 processes a digital detected signal from the ADC & DSP 110. The ADC & DSP 110 comprises a coherent DSP. Because the phase noise of the LO optical signal and modulated optical signal cancel out each other due to SHD, the DSP may have simplified phase tracking. The ADC & DSP 110 receives an analog detected signal from the receiver 115, processes the analog detected signal, converts the analog detected signal to a digital detected signal, and forwards the digital detected signal to the interface IC 107 for further processing.

The splitter 113 splits an input optical signal traveling from the laser 105 into an LO optical signal and an unmodulated optical signal, passes the LO optical signal to the receiver 115, and passes the unmodulated optical signal to the LO port 117. The splitter 113 may be a 3 decibel (dB) splitter, or divider, and may therefore evenly split the input optical signal so that 50% of the input optical signal forms the LO optical signal and 50% of the input optical signal forms the unmodulated optical signal. Alternatively, the splitting percentage is optimized to a different percentage based on a configuration of the system 100.

The receiver 115 is a coherent receiver and may be an integrated coherent receiver (ICR). Integrated means that all optoelectronic components are integrated into a single package. Coherent means that the receiver 115 recovers both amplitude information and phase information. The LO port 117 couples to the LO fiber 123. The signal port 120 couples to the signal fiber 125.

The LO fiber 123 communicates the LO optical signal downstream from the node 103 to the node 127. The signal fiber 125 communicates the modulated optical signal upstream from the node 127 to the node 103. The LO fiber 123 and the signal fiber 125 may be any suitable distance for a short-reach network.

The node 127 comprises an LO port 130, a signal port 133, a modulator 135, and an interface IC 137. The LO port 130 couples to the LO fiber 123. The signal port 133 couples to the signal fiber 125.

The system 100 may be referred to as a unidirectional system. In this context, unidirectional means that modulated optical signals travel in only one direction, either downstream or upstream. In the system 100, that direction is upstream. In contrast, bidirectional means that modulated optical signals travel in both directions, downstream and upstream.

The modulator 135 is a polarization-multiplexing in-phase and quadrature (IQ) modulator. The modulator 135 modulates the unmodulated optical signal using both amplitude information and phase information, for instance using high-order quadrature amplitude modulation (QAM), based on an electrical data signal from the interface IC 137 to produce a modulated optical signal at the wavelength $\lambda$. The modulator 135 may also use any other suitable modulation format. The interface IC 137 provides an electrical data signal to the modulator 135.

In operation, the laser 105 emits an input optical signal with a wavelength of $\lambda$ towards the splitter 113. The splitter 113 splits the input optical signal into an LO optical signal and an unmodulated optical signal, both with a wavelength of $\lambda$. The splitter 113 passes the unmodulated optical signal to the LO port 117 and towards the LO fiber 123 and passes the LO optical signal to the receiver 115. The modulator 135 receives the unmodulated optical signal from the LO fiber 123 and the LO port 130 and receives an electrical data signal from the interface IC 137. The modulator 135 modulates the unmodulated optical signal using both amplitude information and phase information based on the electrical data signal to produce a modulated optical signal, then passes the modulated optical signal at the wavelength $\lambda$ to the signal port 133 and towards the signal fiber 125.

The receiver 115 receives the LO optical signal from the splitter 113 and receives the modulated optical signal from the signal fiber 125 and the signal port 120. The receiver 115 performs coherent detection of the modulated optical signal using the LO optical signal to determine an analog detected signal. Specifically, the receiver 115 detects amplitude information from a mixed signal made up of the LO optical signal and the modulated optical signal. The receiver 115 passes the analog detected signal to the ADC portion of the ADC & DSP 110, which converts the analog detected signal to a digital detected signal. The DSP portion of the ADC & DSP 110 processes the digital detected signal to obtain both amplitude information and phase information as recovered data. The ADC & DSP 110 sends the recovered data to the interface IC 107 for further processing.

Figure 2:
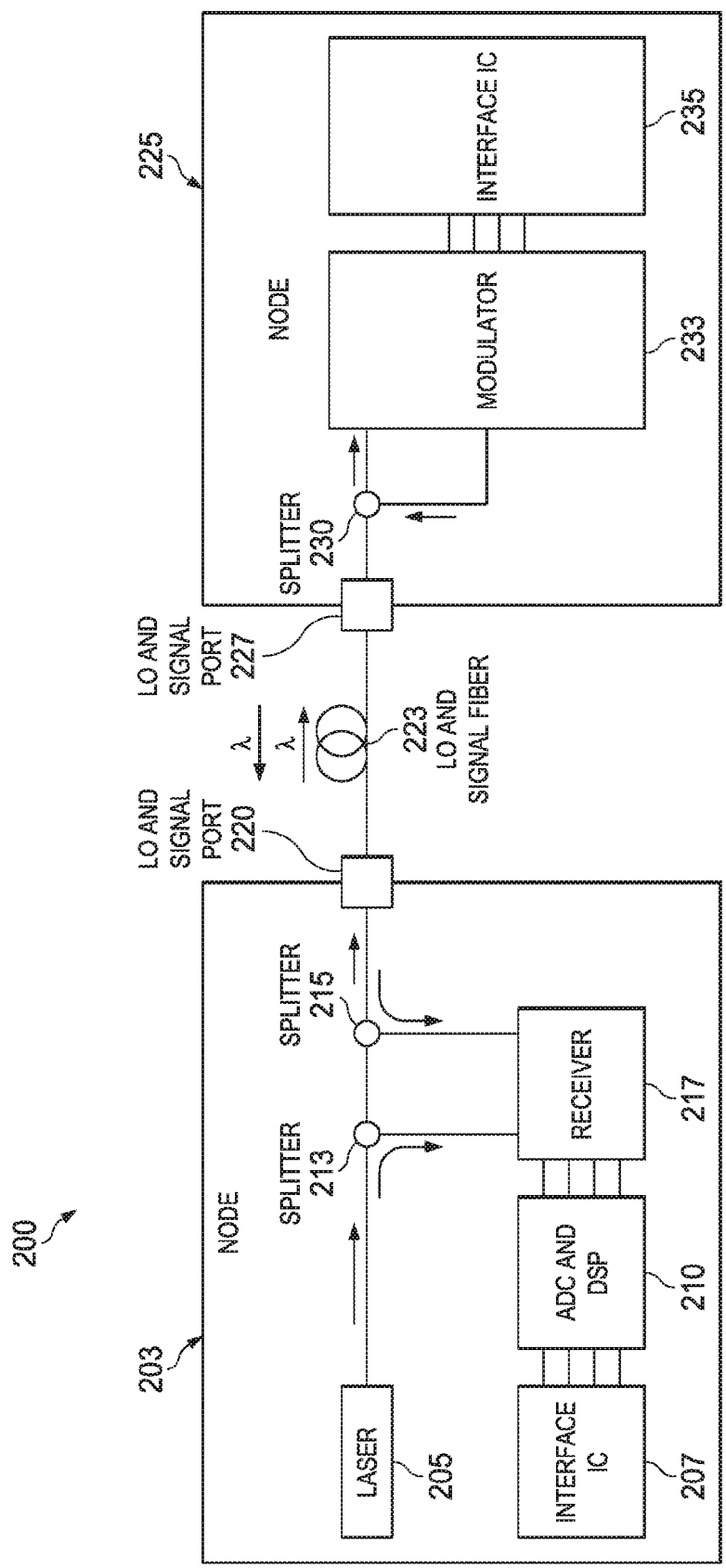
FIG. 2 is a schematic diagram of another optical communications system according to an embodiment of the disclosure.

FIG. 2 is a schematic diagram of another optical communications system 200 according to an embodiment of the disclosure. The system 200 is similar to the system 100. However, unlike the system 100, which uses two fibers, the LO fiber 123 and the signal fiber 125, the system 200 uses a single fiber, an LO & signal fiber 223. The system 200 generally comprises a node 203 and a node 225 coupled to each other via the LO and signal fiber 223. A first direction from the node 203 to the node 225 is referred to as a downstream direction, and a second direction from the node 225 to the node 203 is referred to as an upstream direction. The system 200 is a unidirectional system because, like for the system 100, modulated optical signals travel only in one direction, upstream. The nodes 203, 225 may make up a short-reach optical network.

The node 203 comprises a laser 205, an interface IC 207, an ADC & DSP 210, a splitter 213, and a receiver 217, which are similar to the laser 105, the interface IC 107, the ADC & DSP 110, the splitter 113, and the receiver 115 in FIG. 1, respectively. In addition, the node 203 comprises a splitter 215 and a LO & signal port 220. The splitter 215 passes an unmodulated optical signal from the splitter 213 to the LO & signal port 220 and towards the LO & signal fiber 223. The LO & signal port 220 couples to the LO & signal fiber 223.

The LO & signal fiber 223 communicates the LO optical signal downstream from the node 203 to the node 225. The LO & signal fiber 223 also communicates the modulated optical signal upstream from the node 225 to the node 203. The LO and signal fiber 223 may be any suitable distance for a short-reach network.

The node 225 comprises a modulator 233 and an interface IC 235, which are similar to the modulator 135 and the interface IC 137 in FIG. 1, respectively. In addition, the node 225 comprises an LO & signal port 227 and a splitter 230. The LO & signal port 227 couples to the LO & signal fiber 223. The splitter 230 passes an unmodulated optical signal from the LO & signal port 227 to the modulator 233 and passes a modulated optical signal from the modulator 233 to the LO & signal port 227. To reduce insertion loss, optical circulators may replace the splitters 215, 230. In addition, a reflective modulator may replace the splitter 230 and the modulator 233.

In operation, the laser 205 emits an input optical signal with a wavelength of $\lambda$ towards the splitter 213. The splitter 213 splits the input optical signal into an LO optical signal and an unmodulated optical signal, both with a wavelength of λ. The splitter 213 passes the unmodulated optical signal to the splitter 215 and passes the LO optical signal to the receiver 217. The splitter 215 passes the unmodulated optical signal to the LO & signal port 220 and towards the LO & signal fiber 223. The splitter 230 passes the unmodulated optical signal from the LO & signal fiber 223 and the LO & signal port 227 to the modulator 233. The modulator 233 receives the unmodulated optical signal from the splitter 230 and receives an electrical data signal from the interface IC 235. The modulator 233 modulates the unmodulated optical signal using both amplitude information and phase information based on the electrical data signal to produce a modulated optical signal, then passes the modulated optical signal to the splitter 230. The splitter 230 passes the modulated optical signal to the LO & signal port 227 and towards the LO & signal fiber 223.

The splitter 215 receives the modulated optical signal from the LO & signal fiber 223 and the LO & signal port 220 and passes the modulated optical signal to the receiver 217. The receiver 217 receives the LO optical signal from the splitter 213 and receives the modulated optical signal from the splitter 215. The receiver 217 performs coherent detection of the modulated optical signal using the LO optical signal to determine an analog detected signal. Specifically, the receiver 217 detects amplitude information from a mixed signal made up of the LO optical signal and the modulated optical signal. The receiver 217 passes the analog detected signal to the ADC portion of the ADC & DSP 210, which converts the analog detected signal to a digital detected signal. The DSP portion of the ADC & DSP 210 processes the digital detected signal to obtain both amplitude information and phase information as recovered data. The ADC & DSP 210 sends the recovered data to the interface IC 207 for further processing.

The nodes 203, 225 are simplified compared to typical transceiver nodes. Specifically, the nodes 203, 225 do not need a laser, an ICR, or a DSP for the ICR. The elimination of those components significantly reduces power consumption. That is particularly useful for remote nodes with limited power budgets or remote nodes operating in harsh environments.

Figure 3:
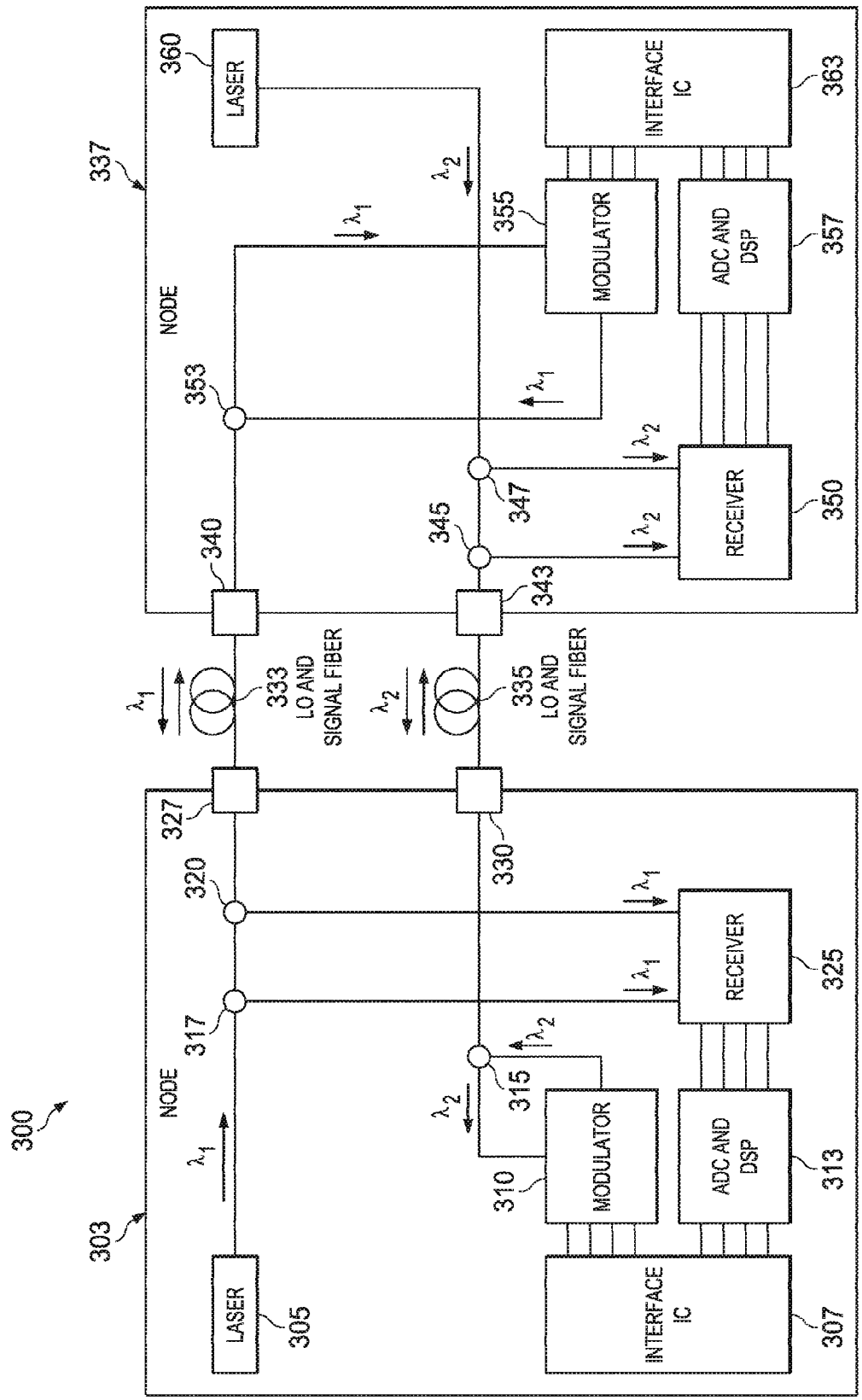
FIG. 3 is a schematic diagram of yet another optical communications system according to an embodiment of the disclosure.

FIG. 3 is a schematic diagram of yet another optical communications system 300 according to an embodiment of the disclosure. The system 300 generally comprises a node 303 and a node 337 coupled to each other via LO and signal fibers 333, 335. A first direction from the node 303 to the node 337 is referred to as a downstream direction, and a second direction from the node 337 to the node 303 is referred to as an upstream direction. The system 300 is a bidirectional system because, unlike for the systems 100, 200, modulated optical signals travel in both directions, downstream and upstream. The nodes 303, 337 may make up a short-reach optical network.

The node 303 comprises a laser 305, an interface IC 307, a modulator 310, an ADC & DSP 313, and a receiver 325, which are similar to the laser 105, the interface IC 107, the modulator 135, the ADC & DSP 110, and the receiver 115, respectively. In addition, the node 303 comprises splitters 315, 317, 320 and LO & signal ports 327, 330. The splitter 315 passes an unmodulated optical signal at a wavelength $\lambda_2$ to the modulator 310 and passes a modulated optical signal at the wavelength $\lambda_2$ to the LO & signal port 330. The splitter 317 splits an input optical signal traveling from the laser 305 into an LO optical signal at a wavelength $\lambda_1$ and an unmodulated optical signal at the wavelength $\lambda_1$, passes the LO optical signal at the wavelength $\lambda_1$ to the receiver 325, and passes the unmodulated optical signal at the wavelength $\lambda_1$ to the splitter 320. The splitter 320 passes the unmodulated optical signal at the wavelength $\lambda_1$ to the LO & signal port 327 and passes a modulated optical signal at the wavelength $\lambda_1$ to the receiver 325. The LO & signal port 327 passes the unmodulated optical signal at the wavelength $\lambda_1$ to the LO & signal fiber 333 and passes a modulated optical signal at the wavelength $\lambda_1$ to the splitter 320. The LO & signal port 330 passes the unmodulated optical signal at the wavelength $\lambda_2$ to the splitter 315 and passes the modulated optical signal at the wavelength $\lambda_2$ to the LO & signal fiber 335.

The LO and signal fiber 333 communicates the LO optical signal at the wavelength $\lambda_1$ from the node 303 to the node 337 and communicates the modulated optical signal at the wavelength $\lambda_1$ from the node 337 to the node 303. The LO and signal fiber 335 communicates the LO optical signal at the wavelength $\lambda_2$ from the node 337 to the node 303 and communicates the modulated optical signal at the wavelength $\lambda_2$ from the node 303 to the node 337. The LO and signal fibers 333, 335 may be any suitable distance for a short-reach network.

The node 337 comprises a receiver 350, a modulator 355, an ADC & DSP 357, a laser 360, and an interface IC 363, which are similar to the receiver 115, the modulator 135, the ADC & DSP 110, the laser 105, and the interface IC 107, respectively. In addition, the node 337 comprises LO & signal ports 327, 330 and splitters 345, 347, 353. The LO & signal port 340 passes the modulated optical signal at the wavelength $\lambda_1$ to the LO & signal fiber 333 and passes the unmodulated optical signal at the wavelength $\lambda_1$ to the splitter 353. The LO & signal port 343 passes the modulated optical signal at the wavelength $\lambda_2$ to the splitter 345 and passes the unmodulated optical signal at the wavelength $\lambda_2$ to the LO & signal fiber 335. The splitter 345 passes the LO optical signal at the wavelength $\lambda_2$ to the LO & signal port 343 and passes the modulated optical signal at the wavelength $\lambda_2$ to the receiver 350. The splitter 347 splits an input optical signal traveling from the laser 360 into the LO optical signal at the wavelength $\lambda_2$ and the unmodulated optical signal at the wavelength $\lambda_2$, passes the LO optical signal at the wavelength $\lambda_2$ to the receiver 350, and passes the unmodulated optical signal at the wavelength $\lambda_2$ to the splitter 345. The splitter 353 passes the unmodulated optical signal at the wavelength $\lambda_1$ to the modulator 355 and passes the modulated optical signal at the wavelength $\lambda_1$ to the LO & signal port 340.

In a first operation, the laser 305 emits an input optical signal at the wavelength $\lambda_1$ towards the splitter 317. The splitter 317 splits the input optical signal into an LO optical signal and an unmodulated optical signal, both at the wavelength $\lambda_1$. The splitter 317 passes the unmodulated optical signal at the wavelength $\lambda_1$ to the splitter 320 and passes the LO optical signal at the wavelength $\lambda_1$ to the receiver 325. The splitter 320 passes the unmodulated optical signal at the wavelength $\lambda_1$ to the LO & signal port 327 and towards the LO & signal fiber 333. The splitter 353 receives the unmodulated optical signal at the wavelength $\lambda_1$ from the LO & signal fiber 333 and the LO & signal port 340 and passes the unmodulated optical signal at the wavelength $\lambda_1$ to the modulator 355. The modulator 355 receives the unmodulated optical signal at the wavelength $\lambda_1$ from the splitter 353 and receives an electrical data signal from the interface IC 363. The modulator 355 modulates the unmodulated optical signal at the wavelength $\lambda_1$ using both amplitude information and phase information based on the electrical data signal to produce a modulated optical signal, then passes the modulated optical signal at the wavelength $\lambda_1$ to the splitter 353. The splitter 353 passes the modulated optical signal at the wavelength $\lambda_1$ to the LO & signal port 340 and towards the LO & signal fiber 333.

The splitter 320 receives the modulated optical signal at the wavelength $\lambda_1$ from the LO & signal fiber 333 and the LO and signal port 327 and passes the modulated optical signal at the wavelength $\lambda_1$ to the receiver 325. The receiver 325 receives the LO optical signal at the wavelength $\lambda_1$ from the splitter 317 and receives the modulated optical signal at the wavelength $\lambda_1$ from the splitter 320. The receiver 325 performs coherent detection of the modulated optical signal at the wavelength $\lambda_1$ using the LO optical signal at the wavelength $\lambda_1$ to determine an analog detected signal. Specifically, the receiver 325 detects amplitude information from a mixed signal made up of the LO optical signal and the modulated optical signal. The receiver 325 passes the analog detected signal to the ADC portion of the ADC & DSP 313, which converts the analog detected signal to a digital detected signal. The DSP portion of the ADC & DSP 313 processes the digital detected signal to obtain both amplitude information and phase information as recovered data. The ADC & DSP 313 sends the recovered data to the interface IC 307 for further processing.

In a second operation, the laser 360 emits an input optical signal at the wavelength $\lambda_2$ towards the splitter 347. The splitter 347 splits the input optical signal into a LO optical signal and an unmodulated optical signal, both at the wavelength $\lambda_2$. The splitter 347 passes the unmodulated optical signal at the wavelength $\lambda_2$ to the splitter 345 and passes the LO optical signal at the wavelength $\lambda_2$ to the receiver 350. The splitter 345 passes the unmodulated optical signal at the wavelength $\lambda_2$ to the LO & signal port 343 and towards the LO & signal fiber 335. The splitter 315 receives the unmodulated optical signal at the wavelength $\lambda_2$ from the LO & signal fiber 335 and the LO & signal port 330 and passes the unmodulated optical signal at the wavelength $\lambda_2$ to the modulator 310. The modulator 310 receives the unmodulated optical signal at the wavelength $\lambda_2$ from the splitter 315 and receives an electrical data signal from the interface IC 307. The modulator 310 modulates the unmodulated optical signal at the wavelength $\lambda_2$ using both amplitude information and phase information based on the electrical data signal to produce a modulated optical signal, then passes the modulated optical signal at the wavelength $\lambda_2$ to the splitter 315. The splitter 315 passes the modulated optical signal at the wavelength $\lambda_2$ to the LO & signal port 330 and towards the LO & signal fiber 335.

The splitter 345 receives the modulated optical signal at the wavelength $\lambda_2$ from the LO & signal fiber 335 and the LO and signal port 343 and passes the modulated optical signal at the wavelength $\lambda_2$ to the receiver 350. The receiver 350 receives the LO optical signal at the wavelength $\lambda_2$ from the splitter 347 and receives the modulated optical signal at the wavelength $\lambda_2$ from the splitter 345. The receiver 350 performs coherent detection of the modulated optical signal at the wavelength $\lambda_2$ using the LO optical signal at the wavelength $\lambda_2$ to determine an analog detected signal. Specifically, the receiver 350 detects amplitude information from a mixed signal made up of the LO optical signal and the modulated optical signal. The receiver 350 passes the analog detected signal to the ADC portion of the ADC & DSP 357, which converts the analog detected signal to a digital detected signal. The DSP portion of the ADC & DSP 357 processes the digital detected signal to obtain both amplitude information and phase information as recovered data. The ADC & DSP 357 sends the recovered data to the interface IC 363 for further processing.

As shown by the two examples, the LO optical signal at the wavelength $\lambda_1$ and the modulated optical signal at the wavelength $\lambda_1$ travel only in the LO & signal fiber 333, while the LO optical signal at the wavelength $\lambda_2$ and the modulated optical signal at the wavelength $\lambda_2$ travel only in the LO & signal fiber 335. As a result, the two modulated optical signals do not travel in the same medium and interfere. This eliminates or significantly reduces a broadband back reflection interference noise that occurs between two modulated optical signals. The lasers 305, 360 may therefore emit optical signals at the same wavelengths or different wavelengths, which improves design flexibility, simplifies network management, and reduces inventory cost.

Though the system 300 eliminates or significantly reduces a broadband reflection interference noise, the system 300 may experience other narrowband noise. First, the LO optical signal beats not only with the modulated optical signal, but also with itself due to back reflection from connectors in the LO & signal fibers 333, 335. The bandwidth of that narrowband back reflection noise, which is usually lower than 100 kHz, depends mainly on a speed of a polarization rotation of the LO optical signal and the modulated optical signal. Second, a mode-hopping effect of the lasers 305, 360 contributes a narrowband intensity noise with a bandwidth lower than 1 megahertz (MHz). The receivers 325, 350 may eliminate or significantly reduce both types of noise by including a low-speed inductor, resistor, capacitor (LRC) circuit in an analog domain or by using DSP in a digital domain.

Figure 4:
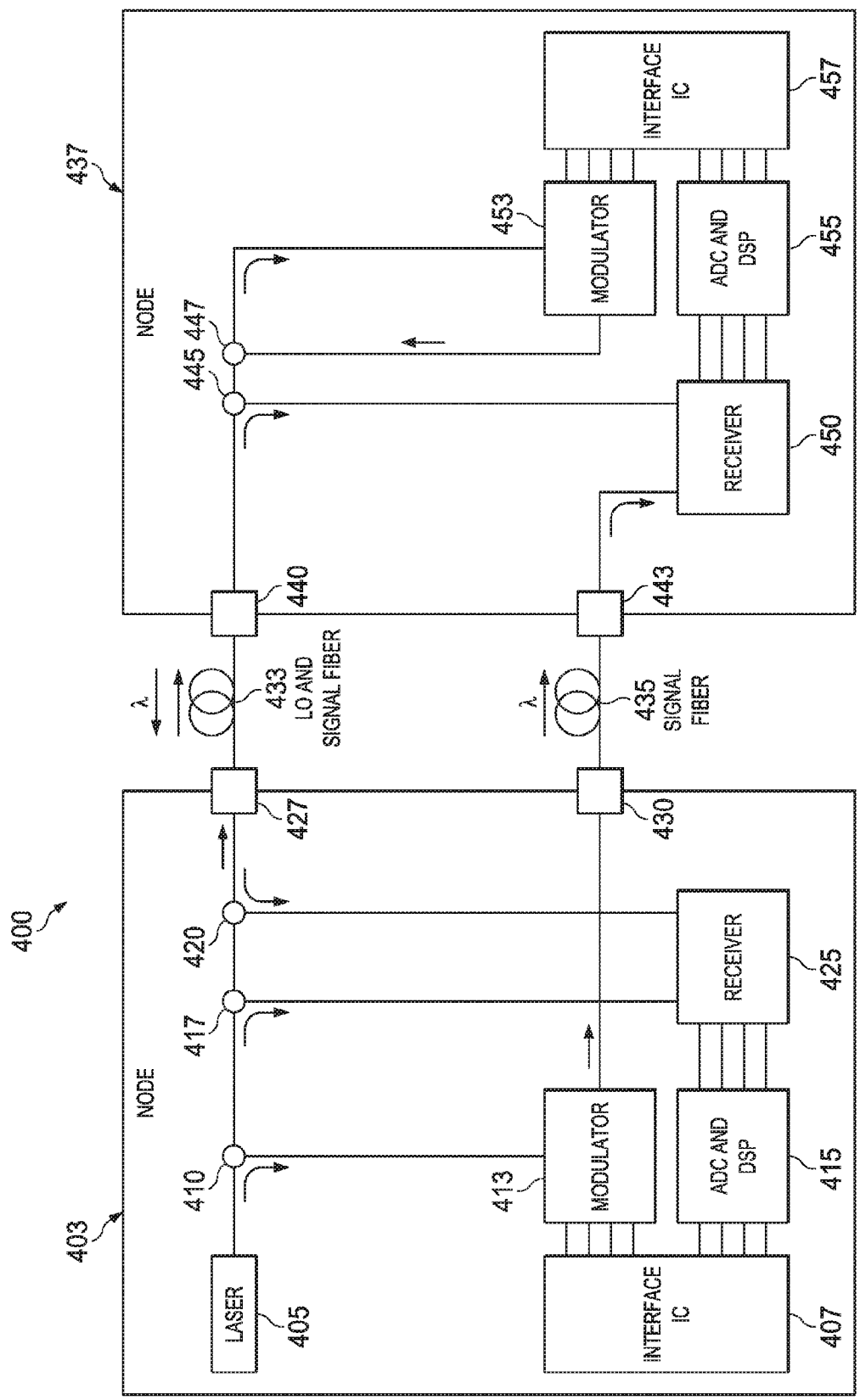
FIG. 4 is a schematic diagram of yet another optical communications system according to an embodiment of the disclosure.

FIG. 4 is a schematic diagram of yet another optical communications system 400 according to an embodiment of the disclosure. The system 400 generally comprises a node 403 and a node 437 coupled to each other via a LO and signal fiber 433 and a signal fiber 435. A first direction from the node 403 to the node 437 is referred to as a downstream direction, and a second direction from the node 437 to the node 403 is referred to as an upstream direction. The system 400 is a bidirectional system because, like for the system 300, modulated optical signals travel in both directions, downstream and upstream. However, unlike the system 300, the system 400 comprises only a single laser, a laser 405. The nodes 403, 437 may make up a short-reach optical network.

The node 403 comprises the laser 405, an interface IC 407, a modulator 413, an ADC & DSP 415, and a receiver 425, which are similar to the laser 105, the interface IC 107, the modulator 135, the ADC & DSP 110, and the receiver 115, respectively. The laser 405 is the only optical signal source in the system 400 and therefore provides a centralized light source for both the node 403 and the node 437. In addition, the node 403 comprises splitters 410, 417, 420; an LO & signal port 427; and a signal port 430.

The LO and signal fiber 433 communicates the LO optical signal at the wavelength $\lambda$ from the node 403 to the node 437 and communicates the modulated optical signal at the wavelength $\lambda$ from the node 437 to the node 403. The signal fiber 435 communicates the modulated optical signal at the wavelength $\lambda$ from the node 403 to the node 437. The LO and signal fiber 433 and the signal fiber 435 may be any suitable distance for a short-reach network.

The node 437 comprises a receiver 450, a modulator 453, an ADC & DSP 455, and an interface IC 457, which are similar to the receiver 115, the modulator 135, the ADC & DSP 110, and the interface IC 107, respectively. The node 437 does not comprise a laser. In addition, the node 437 comprises an LO & signal port 440, a signal port 443, and splitters 445, 447. To reduce insertion loss, optical circulators may replace the splitters 420, 447. In addition, a reflective modulator may replace the splitter 447 and the modulator 453.

In a first example, the laser 405 emits an input optical signal at the wavelength λ towards the splitter 410. The splitter 410 splits the input optical signal into an LO optical signal and an unmodulated optical signal, both at the wavelength λ. The splitter 410 passes the unmodulated optical signal at the wavelength λ to the modulator 413 and passes the LO optical signal at the wavelength λ to the splitter 417. The modulator 413 receives the unmodulated optical signal at the wavelength λ from the splitter 410 and receives an electrical data signal from the interface IC 407. The modulator 413 modulates the unmodulated optical signal at the wavelength λ using both amplitude information and phase information based on the electrical data signal to produce a modulated optical signal, then passes the modulated optical signal at the wavelength λ to the signal port 430 and towards the signal fiber 435. The splitter 417 passes the LO optical signal at the wavelength λ to the splitter 420. The splitter 420 passes the LO optical signal at the wavelength λ to the LO & signal port 427 and towards the LO & signal fiber 433.

The splitter 445 receives the LO optical signal at the wavelength λ from the LO & signal fiber 433 and the LO & signal port 440 and passes the LO optical signal at the wavelength λ to the receiver 450. The receiver 450 receives the LO optical signal at the wavelength λ from the splitter 445 and receives the modulated optical signal at the wavelength λ from the signal fiber 435 and the signal port 443. The receiver 450 performs coherent detection of the modulated optical signal at the wavelength λ using the LO optical signal at the wavelength λ to determine an analog detected signal. Specifically, the receiver 450 detects amplitude information from a mixed signal made up of the LO optical signal and the modulated optical signal. The receiver 450 passes the analog detected signal to the ADC portion of the ADC & DSP 455, which converts the analog detected signal to a digital detected signal. The DSP portion of the ADC & DSP 455 processes the digital detected signal to obtain both amplitude information and phase information as recovered data. The ADC & DSP 455 sends the recovered data to the interface IC 457 for further processing.

In a second operation, the laser 405 emits an input optical signal at the wavelength λ towards the splitter 410. The splitter 410 passes the input optical signal to the splitter 417. The splitter 417 splits the input optical signal into an LO optical signal and an unmodulated optical signal, both at the wavelength λ. The splitter 417 passes the LO optical signal at the wavelength λ to the receiver 425 and passes the unmodulated optical signal at the wavelength λ to the modulator splitter 420. The splitter 420 passes the unmodulated optical signal at the wavelength λ to the LO & signal port 427 and towards the LO & signal fiber 433. The splitter 445 receives the unmodulated optical signal at the wavelength λ from the LO & signal fiber 433 and the LO & signal port 440 and passes the unmodulated optical signal at the wavelength λ to the splitter 447. The splitter 447 passes the unmodulated optical signal at the wavelength λ to the modulator 453. The modulator 453 receives the unmodulated optical signal at the wavelength λ from the splitter 447 and receives an electrical data signal from the interface IC 457. The modulator 453 modulates the unmodulated optical signal at the wavelength λ using both amplitude information and phase information based on the electrical data signal to produce a modulated optical signal, then passes the modulated optical signal at the wavelength λ to the splitter 447. The splitter 447 passes the modulated optical signal at the wavelength λ to the splitter 445. The splitter 445 passes the modulated optical signal at the wavelength λ to the LO & signal port 440 and towards the LO & signal fiber 433.

The splitter 420 receives the modulated optical signal at the wavelength λ from the LO & signal fiber 433 and the LO & signal port 427 and passes the modulated optical signal at the wavelength λ to the receiver 425. The receiver 425 receives the modulated optical signal at the wavelength λ from the splitter 420 and receives the LO optical signal at the wavelength λ from the splitter 417. The receiver 425 performs coherent detection of the modulated optical signal at the wavelength λ using the LO optical signal at the wavelength λ to determine an analog detected signal. Specifically, the receiver 425 detects amplitude information from a mixed signal made up of the LO optical signal and the modulated optical signal. The receiver 425 passes the analog detected signal to the ADC portion of the ADC & DSP 415, which converts the analog detected signal to a digital detected signal. The DSP portion of the ADC & DSP 415 processes the digital detected signal to obtain both amplitude information and phase information as recovered data. The ADC & DSP 415 sends the recovered data to the interface IC 407 for further processing.

As shown, the laser 405 is the only optical signal source for the system 400. The laser 405 provides the LO optical signal and the unmodulated optical signal for both the node 403 and the node 437. This improves design flexibility, simplifies network management, and reduces inventory cost.

The nodes 103, 127, 203, 225, 303, 337, 403, 437 may be referred to as optical nodes, optical transceivers, or optical transceiver nodes. The nodes 103, 203, 303, 403 may further be referred to as master nodes. They may be located in a central office (CO), optical line terminal (OLT), headend, or other suitable location or apparatus. The nodes 127, 225, 337, 437 may further be referred to as remote nodes. They may be located in an optical network unit (ONU), an optical network terminal (ONT), a remote radio head (RRH) in a mobile fronthaul network, or other suitable location or apparatus.

Figure 5:
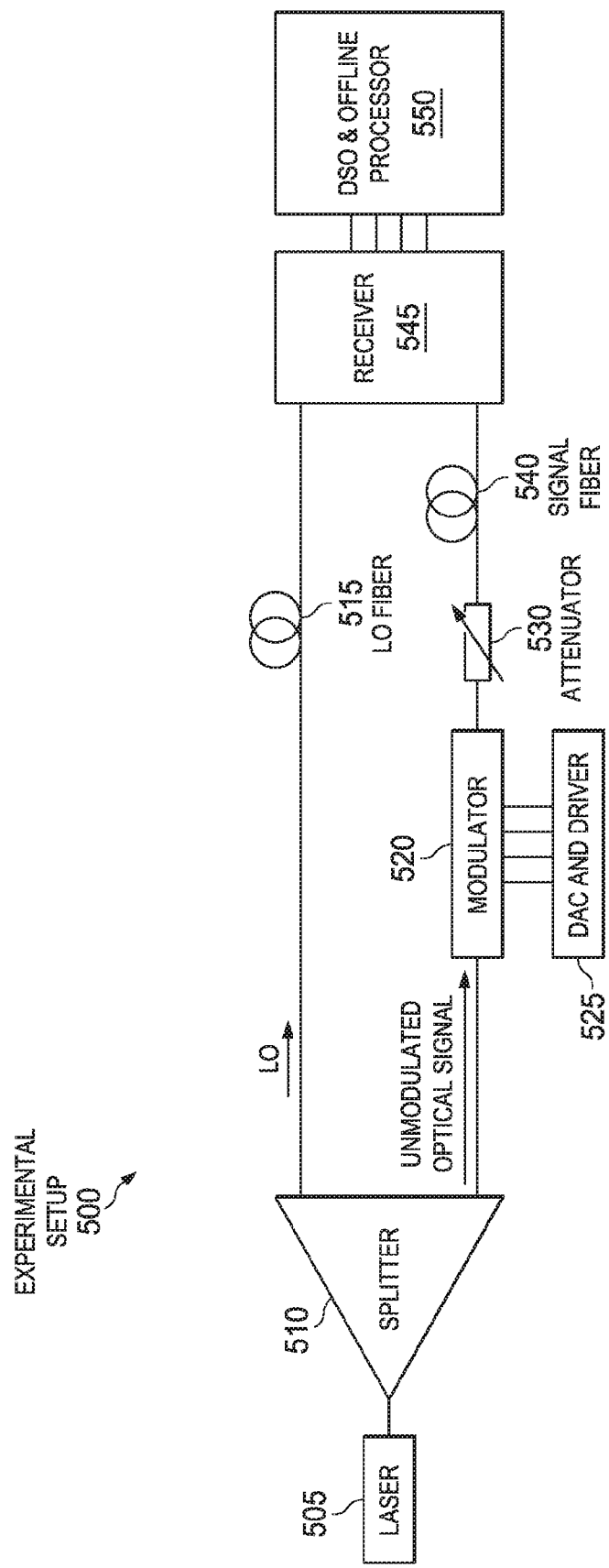
FIG. 5 is a schematic diagram of an experimental setup.

FIG. 5 is a schematic diagram of an experimental setup 500. The setup 500 was used to model the systems 100, 200, 300, 400 described above in order to provide the performance metrics described below. The setup 500 comprises a laser 505, a splitter 510, a LO fiber 515, a modulator 520, a digital-to-analog converter (DAC) & driver 525, an attenuator 530, a signal fiber 540, a receiver 545, and a digital store oscilloscope (DSO) and offline processor 550.

The laser 505 is an uncooled DFB laser with a linewidth of 1.5 MHz. The laser 505 emits an input optical signal at a power of 8.5 decibel milliwatts (dBm). The splitter 510 receives the input optical signal from the laser 505, splits the input optical signal into an LO optical signal and an unmodulated optical signal, passes the LO optical signal to a top path of the setup 500, and passes the unmodulated optical signal to a bottom path of the setup 500. The top path comprises the LO fiber 515, and the bottom path comprises the modulator 520, the DAC & driver 525, the attenuator 530, and the signal fiber 540.

The DAC & driver 525 comprises a DAC with four channels and a 56 gigahertz (GHz) sampling rate to generate a high-speed electrical data signal. The DAC portion of the DAC & driver 425 maps about $2^{15}$ pseudorandom binary sequences (PRBSs) to 28 gigabaud (Gbaud) dual-polarization, order 16 QAM (16-QAM), and the driver portion of the DAC & driver 425 amplifies the signal before passing it to the modulator 520. The modulator 520 modulates the unmodulated optical signal at the wavelength using both amplitude information and phase information based on the electrical data signal to produce a modulated optical signal, then passes the modulated optical signal to the attenuator 530. The attenuator 530 adjusts the power of the modulated optical signal so that the DSO and offline processor 550 can measure the sensitivity of the receiver 545.

The receiver 545 receives the LO optical signal from the LO fiber 515 and receives the modulated optical signal from the signal fiber 540. The receiver 545 performs coherent detection of the modulated optical signal using the LO optical signal to determine an analog detected signal. Specifically, the receiver 545 detects amplitude information from a mixed signal made up of the LO optical signal and the modulated optical signal. The receiver 545 passes the analog detected signal to the DSO & offline processor 550. The DSO portion of the DSO & offline processor 550 converts the analog detected signal to a digital detected signal. The offline processor portion of the DSO & offline processor 550 recovers amplitude information and phase information from the digital detected signal.

Figure 6:
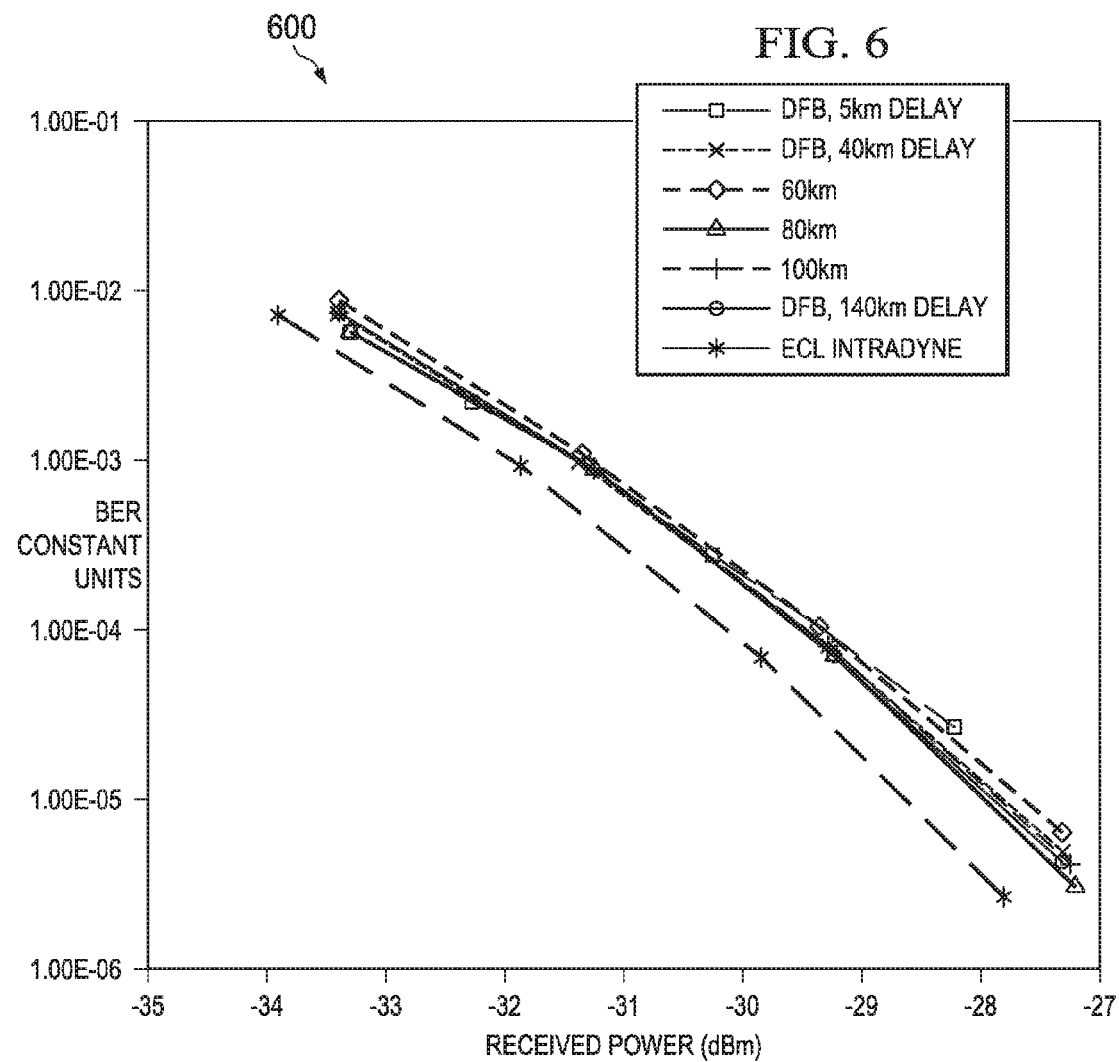
FIG. 6 is a graph of bit error rates (BERs) for the setup in FIG. 5 using different lasers and detection schemes.

FIG. 6 is a graph 600 of BERs for the setup 500 in FIG. 5 using different lasers and detection schemes. The x-axis represent the power in units of dBm of signals received by the receiver 545, and the y-axis represents BER in constant or arbitrary units. The square, x, diamond, triangle, vertical line, and circle plots result from using a DFB laser for the laser 505, using SHD, and inserting path delays of 5 km, 40 km, 60 km, 80 km, 100 km, and 140 km, respectively. The asterisk plot results from using an ECL laser, using intradyne detection, and inserting no path delay. In this context, intradyne detection means that separate lasers are used for the LO optical signal and the unmodulated optical signal. As shown, the DFB laser plots demonstrate nearly identical performance. In other words, the uncooled DFB laser and SHD approach is very tolerant of path delay. The DFB laser plots also demonstrate about a −29.8 dBm power at a BER of $2e^{-4}$ for all path delays. Compared to the ECL plot, the DFB laser plots show that the DFB laser introduces only about a 0.6 dBm power penalty when using SHD.

Figure 7:
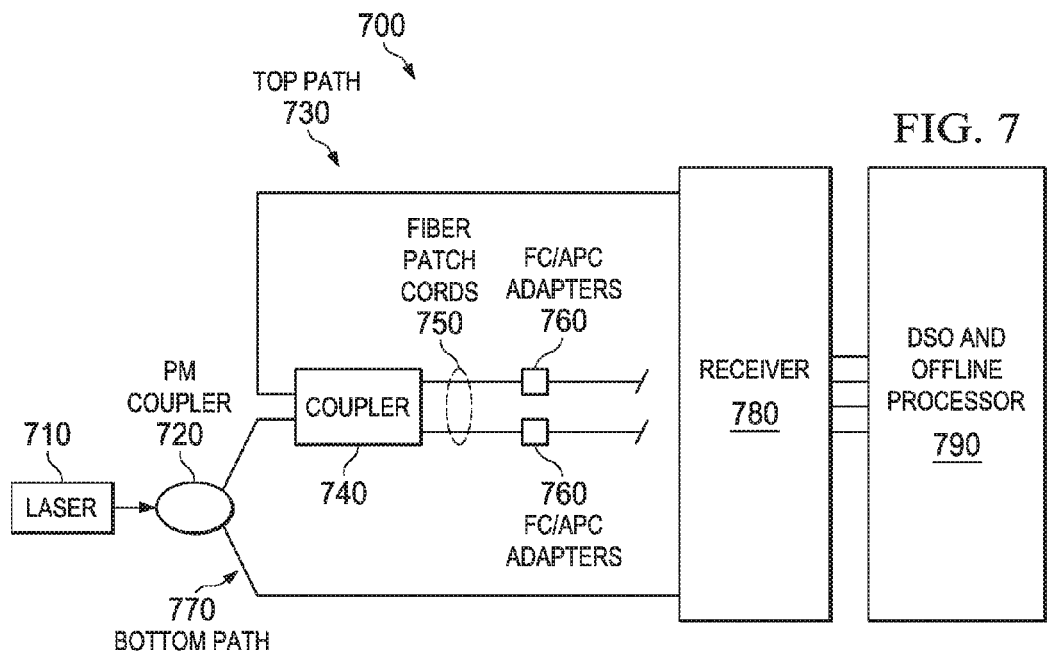
FIG. 7 is a schematic diagram of another experimental setup.

FIG. 7 is a schematic diagram of another experimental setup 700. As mentioned above, a small portion of LO optical signals may cause narrowband back reflection interference noise. The setup 700 characterizes that narrowband back reflection interference noise. The setup comprises a laser 710, a polarization-maintaining (PM) coupler 720, a top path 730, a coupler 740, fiber patch cords 750, ferrule connector/angled physical contacts (FC/APCs) 760, a bottom path 770, a receiver 780, and a DSO & offline processor 790. The laser 710 is a DFB laser without temperature control, and the PM coupler 720 is a 3 dB PM coupler.

The laser 710 emits an input optical signal. The PM coupler 720 receives the input optical signal, splits the input optical signal into a first optical signal and a second optical signal, passes the first optical signal to the coupler 740, and passes the second optical signal to the bottom path 770 and towards the receiver 780. The second optical signal is an LO optical signal. The coupler 740 splits the first optical signal into a third optical signal and a fourth optical signal, and passes the third optical signal and the fourth optical signal to the fiber patch cords 750. The FC/APC adaptors 760 terminate the fiber patch cords 750, so reflections from the FC/APC adaptors 760 travel back to the coupler 740. The coupler 740 combines the reflections into a fifth optical signal, then passes the fifth optical signal to the top path 730 and towards the receiver 780. The fifth optical signal represents narrowband back reflection interference noise.

The receiver 780 receives the fifth optical signal from the top path 730 and receives the LO optical signal from the bottom path 770. The receiver 780 performs coherent detection of the fifth optical signal using the LO optical signal to determine an analog detected signal. Specifically, the receiver 780 detects amplitude information from a mixed signal made up of the LO optical signal and the fifth optical signal. The receiver 780 passes the analog detected signal to the DSO & offline processor 780. The DSO portion of the DSO & offline processor 780 converts the analog detected signal to a digital detected signal. The offline processor portion of the DSO & offline processor recovers amplitude information and phase information from the digital detected signal.

Figure 8:
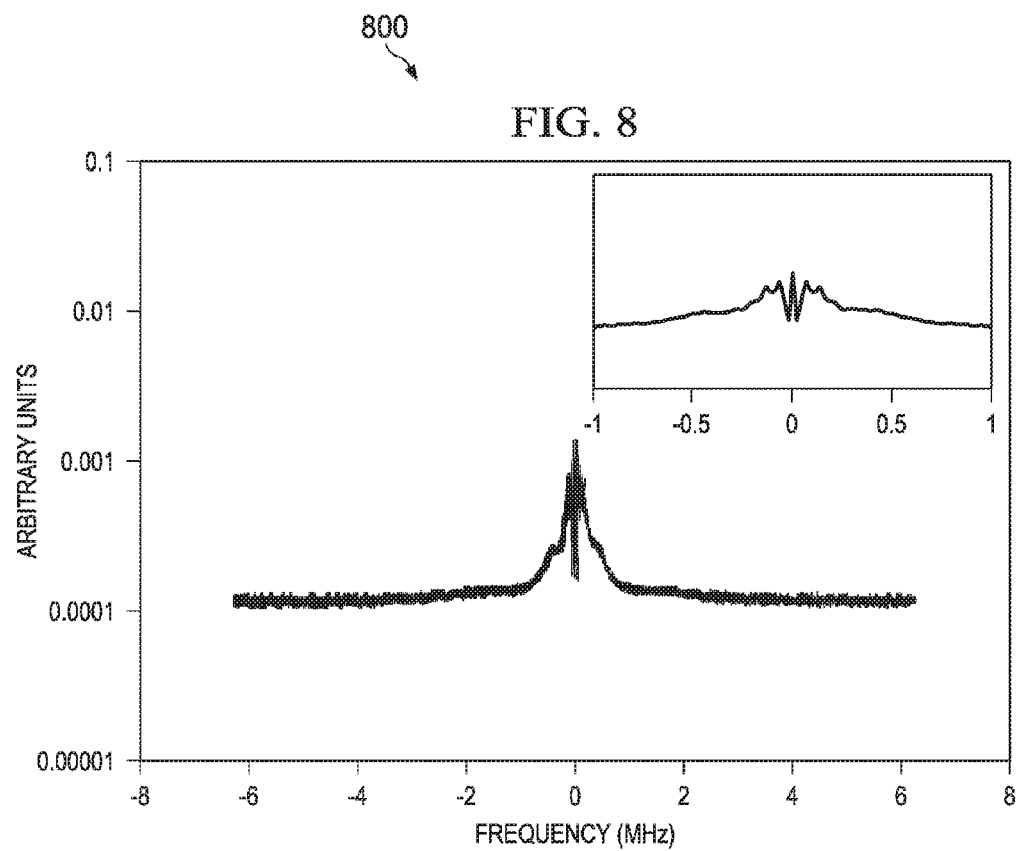
FIG. 8 is a graph of a fast Fourier transform (FFT) spectrum of back reflection interference noise for the setup in FIG. 7.

FIG. 8 is a graph 800 of an FFT spectrum of noise for the setup 700 in FIG. 7. The x-axis represents frequency in MHz, and the y-axis represents arbitrary units. As shown, the spectrum comprises a central peak and two side lobes of that central peak. The linewidth of the central peak is about 10 kHz. The central peak is due to low speed effects such as polarization rotation and temperature variation. The side lobes may be due to amplitude fluctuation from mode hopping. The total bandwidth of the noise is about 1 MHz, which may be eliminated or significantly reduced by an LRC circuit in an analog domain or by using DSP in a digital domain.

Figure 9:
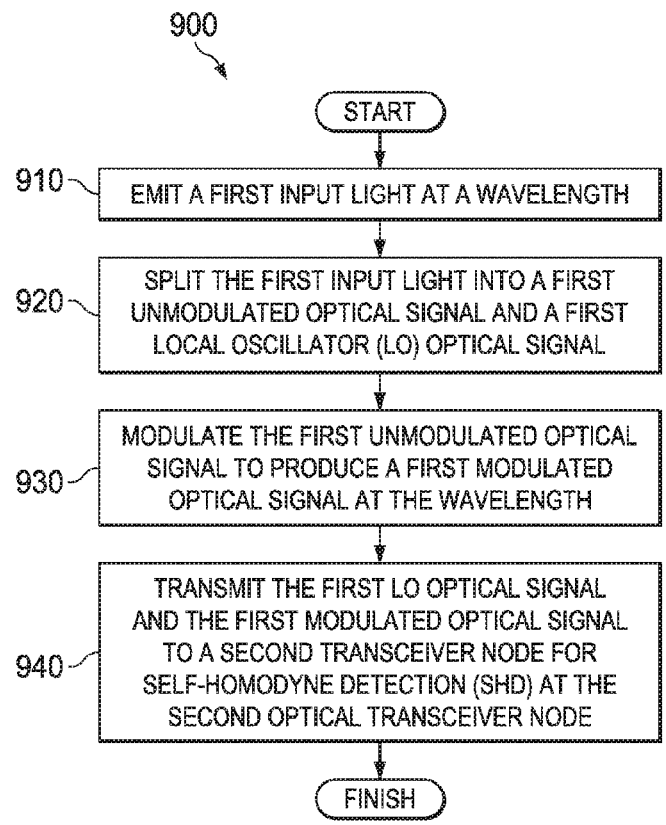
FIG. 9 is a flowchart illustrating a method of SHD and remote modulation according to an embodiment of the disclosure.

FIG. 9 is a flowchart illustrating a method 900 of SHD and remote modulation according to an embodiment of the disclosure. The node 403 in the system 400 may implement the method 900 at any suitable time. At step 910, a first input light is emitted at a wavelength. For instance, the laser 405 emits the first input light at the wavelength λ. At step 920, the first input light is split into a first unmodulated optical signal and a first LO optical signal. The first unmodulated optical signal and the first LO optical signal are at the wavelength. For instance, the splitter 410 splits the input light into the first unmodulated optical signal and the first LO optical signal, both at the wavelength λ. At step 930, the first unmodulated optical is modulated to produce a first modulated optical signal at the wavelength. For instance, the modulator 413 modulates the first unmodulated optical signal to produce the first modulated optical signal at the wavelength λ. Finally, at step 940, the first LO optical signal and the first modulated optical signal are transmitted to a second optical transceiver node for SHD at the second optical transceiver node. For instance, the LO & signal port 427 transmits the first LO optical signal to the node 437, and the signal port 430 transmits the first modulated optical signal to the node 437. The method 900 is a method for directing traffic downstream as in the first operation described above with respect to FIG. 4. Another method is a method for directing traffic upstream as in the second operation described above with respect to FIG. 4.

Figure 10:
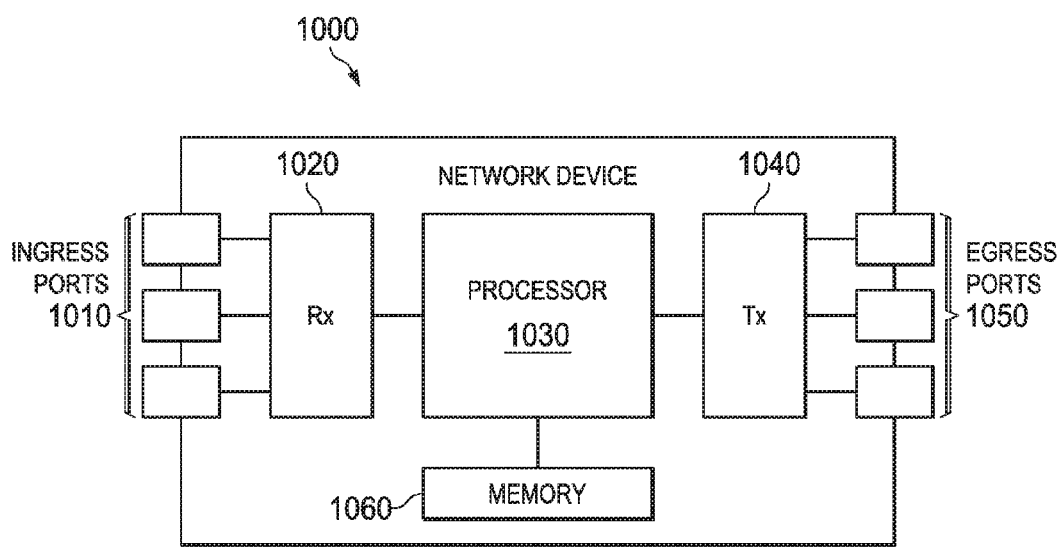
FIG. 10 is a schematic diagram of a network device according to an embodiment of the disclosure.

FIG. 10 is a schematic diagram of a network device 1000 according to an embodiment of the disclosure. The device 1000 is suitable for implementing the disclosed embodiments described above, for instance the components of the systems 100, 200, 300, 400 and the setups 500, 700. The device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by any suitable combination of hardware, middleware, firmware, and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060.

The memory 1060 comprises one or more disks, tape drives, and solid-state drives and may be used as an overflow data storage device, to store programs when such programs are selected for execution, and to store instructions and data that are read during program execution. The memory 1060 may be volatile and non-volatile and may be read-only memory (ROM), random-access memory (RAM), ternary content-addressable memory (TCAM), or static random-access memory (SRAM).

A first component is directly coupled to a second component when there are no intervening components, except for a line, a trace, or other medium between the first component and the second component. The first component is indirectly coupled to the second component when there are intervening components other than a line, a trace, or another medium between the first component and the second component. The termed "coupled" and its derivatives includes both directly coupled and indirectly coupled.

The use of the term "about" means a range including ±10% of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first optical transceiver node comprising:
a laser configured to emit an input optical signal;
a first splitter coupled to the laser and configured to split the input optical signal into a local oscillator (LO) optical signal and an unmodulated optical signal; and
a receiver coupled to the first splitter and configured to:
receive the LO optical signal from the first splitter;
receive a modulated optical signal from a second optical transceiver node, wherein the modulated optical signal is a modulated version of the unmodulated optical signal; and
perform phase noise cancellation of the modulated optical signal using the LO optical signal.

2. The first optical transceiver node of claim 1, further comprising a first port coupled to the first splitter and configured to:
receive the unmodulated optical signal from the first splitter; and
transmit the unmodulated optical signal to the second optical transceiver node.

3. The first optical transceiver node of claim 2, further comprising a second port coupled to the receiver and configured to:
receive the modulated optical signal from the second optical transceiver node; and
pass the modulated optical signal to the receiver.

4. The first optical transceiver node of claim 1, further comprising:
a second splitter coupled to the first splitter; and
a port coupled to the second splitter.

5. The first optical transceiver node of claim 4, wherein the second splitter is configured to:
receive the unmodulated optical signal from the first splitter;
pass the unmodulated optical signal to the port;
receive the modulated optical signal from the port; and
pass the modulated optical signal to the receiver.

6. The first optical transceiver node of claim 5, wherein the port is configured to:
receive the unmodulated optical signal from the second splitter;
transmit the unmodulated optical signal to the second optical transceiver node;
receive the modulated optical signal from the second optical transceiver node; and
pass the modulated optical signal to the second splitter.

7. The first optical transceiver node of claim 1, wherein the laser and the receiver are together configured to implement self-homodyne detection (SHD) using remote modulation.

8. The first optical transceiver node of claim 1, wherein the laser is an uncooled distributed feedback (DFB) laser with a linewidth greater than 100 kilohertz (kHz).

9. A first optical transceiver node comprising:
a first port configured to:
transmit a first unmodulated optical signal to a second optical transceiver node, wherein the first unmodulated optical signal is at a first wavelength; and
receive a first modulated optical signal from the second optical transceiver node, wherein the first modulated optical signal is at the first wavelength and is a modulated version of the first unmodulated optical signal; and
a second port configured to:
receive a second unmodulated optical signal from the second optical transceiver node, wherein the second unmodulated optical signal is at a second wavelength; and
transmit a second modulated optical signal from the second optical transceiver node, wherein the second modulated optical signal is at the second wavelength and is a modulated version of the second unmodulated optical signal.

10. The first optical transceiver node of claim 9, further comprising:
a laser configured to emit an input optical signal, wherein the input optical signal is at the first wavelength; and a first splitter coupled to the laser and configured to split the input optical signal into a first local oscillator (LO) optical signal and the first unmodulated optical signal, wherein the first LO optical signal and the first unmodulated optical signal are at the first wavelength.

11. The first optical transceiver node of claim 10, further comprising a second splitter coupled to the first splitter and the first port and configured to pass the first unmodulated optical signal to the first port.

12. The first optical transceiver node of claim 11, further comprising a receiver configured to:
receive the first LO optical signal from the first splitter;
receiver the first modulated optical signal from the second splitter; and
perform phase noise cancellation of the first modulated optical signal using the first LO optical signal.

13. The first optical transceiver node of claim 9, further comprising a splitter coupled to the second port and configured to:
receive the second unmodulated optical signal from the second port;
receive the second modulated optical signal; and
pass the second modulated optical signal to the second port.

14. The first optical transceiver node of claim 13, further comprising a modulator configured to:
receive the second unmodulated optical signal from the splitter;
receive an electrical data signal;
modulate the second unmodulated optical signal using both amplitude information and phase information based on the electrical data signal to produce the second modulated optical signal; and
pass the second modulated optical signal to the splitter.

15. The first optical transceiver node of claim 9, wherein the first optical transceiver node is configured to reduce a broadband back reflection interference noise between the first modulated optical signal and the second modulated optical signal by receiving the first modulated optical signal via the first port and receiving the second modulated optical signal via the second port.

16. A method implemented in a first optical transceiver node, the method comprising:
emitting a first input light at a wavelength;
splitting the first input light into a first unmodulated optical signal and a first local oscillator (LO) optical signal, wherein the first unmodulated optical signal and the first LO optical signal are at the wavelength;
modulating the first unmodulated optical signal to produce a first modulated optical signal at the wavelength; and
transmitting the first LO optical signal and the first modulated optical signal to a second optical transceiver node for self-homodyne detection (SHD) at the second optical transceiver node.

17. The method of claim 16, further comprising:
emitting a second input light at the wavelength;
splitting the second input light into a second LO optical signal and a second unmodulated optical signal, wherein the second LO optical signal and the second unmodulated optical signal are at the wavelength;
transmitting the second unmodulated optical signal to a second optical transceiver node;
receiving a second modulated optical signal from the second optical transceiver node, wherein the second modulated optical signal is a modulated version of the second unmodulated optical signal at the wavelength; and
performing SHD using the second LO optical signal and the second modulated optical signal.

18. The method of claim 17, further comprising:
performing coherent detection of the second modulated optical signal using the second LO optical signal to determine amplitude information of an analog detected signal;
processing the analog detected signal; and
converting the analog detected signal to a digital detected signal.

19. The method of claim 17, wherein the transmitting the first modulated optical signal comprises transmitting the first modulated optical signal using a first medium, and wherein the receiving the second modulated optical signal comprises receiving the second modulated optical signal using a second medium.

20. The method of claim 16, further comprising providing a centralized light source for both the first optical transceiver node and the second optical transceiver node.

* * * * *